June 29, 1937.  H. M. SACKS  2,085,704

COMBINATION TEETHING RING AND PACIFIER

Filed Nov. 18, 1935

Inventor
Harry M. Sacks

By
J. Kahlan
Attorney

Patented June 29, 1937

2,085,704

UNITED STATES PATENT OFFICE 2,085,704

COMBINATION TEETHING RING AND PACIFIER

Harry M. Sacks, Philadelphia, Pa.

Application November 18, 1935, Serial No. 50,431

4 Claims. (Cl. 128—360)

This invention relates to teething rings and pacifiers.

The main object of the invention is to provide a teething ring and pacifier which can be used separately or in combination and provided with means to hold the two elements together.

A still further object of the invention is to make the pacifier of hollow and relatively flexible rubber and the teething ring of solid and relatively stiff rubber.

A still further object of the invention is to arrange the device so that the two elements can be easily joined together and difficult to separate.

With these and other objects in view the invention consists in general of certain novel details of construction and combinations of parts hereinafter fully described, illustrated in the accompanying drawing and specifically claimed.

Figure 2:
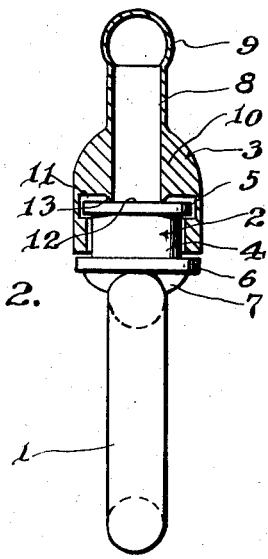
Figure 2 is an end view thereof with the pacifier in section.

Referring to the drawing in detail, numeral 1 designates the teething ring circular in cross section and preferably made of solid rubber with a knob 2 at the top to hold the pacifier 3. The knob as shown in Figure 2 comprises a cylindrical member 4 provided with upper and lower flange members 5 and 6. The diameter of the upper flange member is smaller than the diameter of the lower flange member and at the underface thereof are reinforcing brackets 7 for keeping the said flange on an even plane.

The pacifier is made from relative soft rubber and comprises a hollow cylindrical body portion 8 having a bulbous top 9 and a thickened skirt portion 10. The interior of the lower end of the skirt portion is enlarged to accommodate the cylindrical member 4 of the teething ring and a grooved portion 11 is provided in which fits the flange 5 of the teething ring. Bearing on the top face 12 of the cylindrical member 4 is a lip 13 formed in the interior of the pacifier. This lip being in resilient contact with the said member will prevent any relative movement of the pacifier and teething ring.

Figure 1:
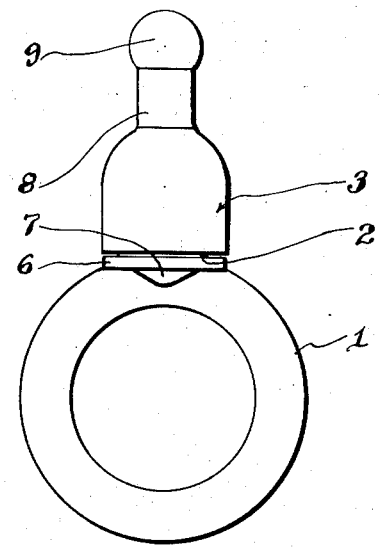
Figure 1 is a front view of the combination teething ring and pacifier.
Figure 3:
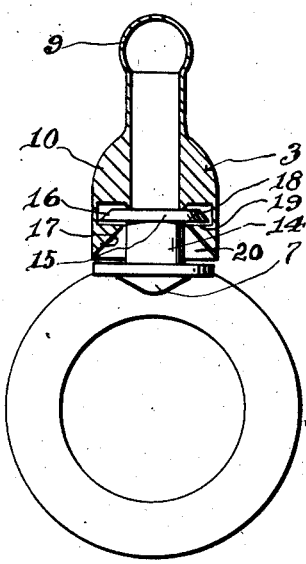
Figure 3 is a front view of a modified form of the combination teething ring and pacifier with the pacifier shown in section.

The modified form of the invention shown in Figure 3 is the same as that shown in Figure 1 with the exception that means are provided to easily attach the pacifier and teething ring and yet make it more difficult to separate the two elements. In this form of the invention the cylindrical member 14 is somewhat smaller in diameter than the corresponding member 4 with the upper flange 15 provided with a tapering edge 16. The interior of the skirt portion is also provided with a similar taper as at 17. Thus when the pacifier is applied the tapering edges 16 and 17 will ride over each other and allow the pacifier to slip on very easily. However it will be somewhat difficult to separate the parts in view of the relatively wide shoulder portions 18 and 19 at the lower face of the flange 15 and the upper face 19 of the recess 20 formed in the interior or the skirt portion of the nipple.

There has thus been provided a simple and efficient device of the kind described and for the purpose specified.

It is obvious that changes may be made in the form and construction of the invention without departing from the material principles involved. It is not therefore desired to confine the invention to the exact form herein shown and described but it is desired to include all such as come within the scope of the appended claims.

Having described my invention, I claim:

1. In a device of the class described, a ring-like member, a cylindrical knob at the top of said member, a flange at the top of said knob, the periphery of said flange being tapered, a pacifier having an enlarged interior portion and a deepened recess portion, the wall of said enlarged interior portion being tapered, said flange fitting in said deepened recess portion.

2. In a device of the class described, a ring-like member, a cylindrical knob at the top of said member, a flange at the top of said knob, the periphery of said flange being tapered, a pacifier having an enlarged interior portion and a deepened recess portion, the wall of said enlarged interior portion being tapered, said flange fitting in said deepened recess portion, the taper on the periphery of said flange and the taper of the interior wall of said enlarged portion being substantially equal.

3. In a device of the class described, a ring-like member, a cylindrical knob at the top of said member provided with upper and lower flanges, a pacifier, the upper portion of said pacifier made from relatively soft rubber and comprising a hollow cylindrical body portion with a thickened lower skirt portion, the interior of said skirt portion being enlarged to accommodate said cylindrical knob and provided with a groove in which fits the upper flange of said cylindrical knob.

4. In a device of the class described, a ring-like member, a cylindrical knob at the top of said member provided with upper and lower flanges, a pacifier, the upper portion of said pacifier made from relatively soft rubber and comprising a hollow cylindrical body portion with a thickened lower skirt portion, the interior of said skirt portion being enlarged to accommodate said cylindrical knob, and provided with a groove in which fits the upper flange of said cylindrical knob, and a lip formed in the interior of said pacifier and adapted to bear on the top face of said knob.

HARRY M. SACKS.